Figure 1:
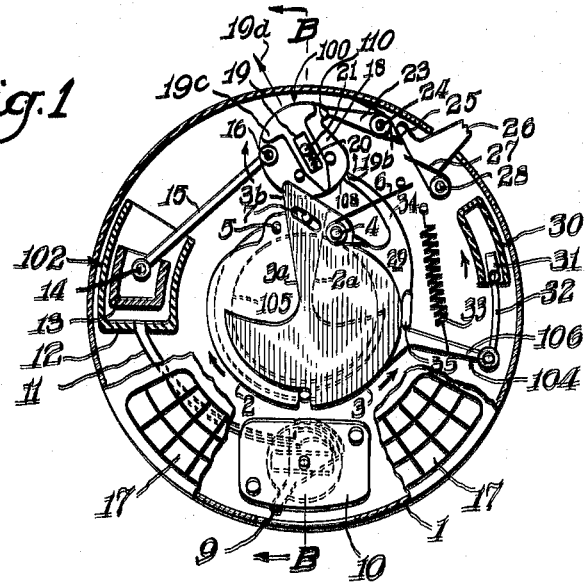

Jan. 25, 1966  J. DURST  3,230,853

PHOTOGRAPHIC LENS SHUTTER MECHANISM

Filed Dec. 19, 1961

INVENTOR
Julius Durst

BY Connolly and Hutz

ATTORNEYS 3,230,853
PHOTOGRAPHIC LENS SHUTTER MECHANISM
Julius Durst, Brixen, near Bozen, Italy, assignor to Durst
 S.p.A. Fabrica Macchine Ed Apparecchi Fototecnici,
 Bolzano, Italy
Filed Dec. 19, 1961, Ser. No. 160,504
Claims priority, application Italy, Jan. 20, 1961,
1,373/61
10 Claims. (Cl. 95—62)

This invention relates to a photographic lens shutter mechanism of the central type, and it more particularly relates to such a mechanism which is particularly well adapted for automatic control.

In controlling the adjustment of photographic lens shutter mechanisms manually or automatically, the aperture opening and/or shutter speed must be varied. The power required for making such adjustments complicates and expands the size of automatic exposure-regulating devices. However, even so it is quite difficult to make such devices operative within the full indicating range of available light-measuring instruments such as photoelectric exposure meters. For this reason the automatically regulated shutters have been limited to speeds of up to $\frac{1}{500}$ second within their full range of aperture openings; and for smaller aperture openings it is possible to provide faster speeds even below $\frac{1}{1000}$ sec. However, existing types of such shutters are still not operative over the full indicating range of available exposure meters, and they are quite complicated and expensive.

An object of this invention is to provide a relatively simple, economical and compact photographic lens shutter mechanism adaptable for automatic regulation which is adjustable automatically substantially over the entire effective indicating range of available light-measuring meters.

In accordance with this invention the aperture opening defined by the shutter blades is governed by their speed of movement. The blade-driving means is accordingly arranged to deliver faster opening impulses of shorter duration and slower impulses of longer duration, which make the effective diaphragm opening between the blades larger as their speed of movement becomes slower. A motion-limiting means is also mounted in the path of the opening movement of the blades for cooperating with their speed of movement to vary their effective aperture opening. A coordinating means connects the motion-limiting means with the blade-driving means for causing the motion-limiting means to start moving away from the path of movement of the shutter blades when the shutter is released. At higher speeds this motion-limiting means, which carries an anvil against which the blades rebound to reverse their direction of movement, has practically no time to move away from the blades; and they are therefore substantially immediately rebounded closed to provide very small aperture openings, such as $f/22$. However, if the blade-driving means is controlled (such as by a pneumatic automatic exposure regulating device of the type described in U.S. Patent No. 2,800,844) to cause relatively slower movement of the blades, the motion-limiting means has sufficient time to move its anvil a considerable distance away from the blades to considerably delay the return movement of the blades until larger aperture openings are obtained up to full opening. This device accordingly controls both the shutter speed and aperture opening making it possible to eliminate the usual iris diaphragm, thereby permitting an automatic exposure regulating device of the type described in U.S. Patent 2,800,844 to be mounted within the shutter casing.

Figure 2:
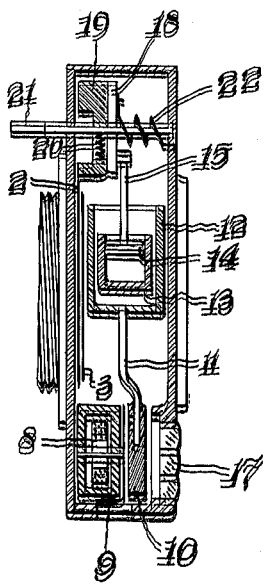

Novel features and advantages of the present invention will become apparent to one skilled in the art from a reading of the following description in conjunction with the accompanying drawings wherein similar reference characters refer to similar parts and in which:

FIG. 1 is a schematic front view in elevation of one embodiment of this invention; and FIG. 2 is a cross-sectional view taken through FIG. 1 along the line 2—2.

In FIGS. 1 and 2 is shown a photographic lens shutter mechanism of the central type enclosed within a shutter casing 1. Shutter blades 2 and 3 are movably mounted upon casing 1 by pivot pins 4 and 5, and they are resiliently biased into the closed position by spring 6 of the torsion type, which reacts between blade 3 and casing 1 in a direction to close blades 2 and 3. The form of blade 3 is cross-hatched to distinguish it from blade 2 over which it extends. An aperture opening of substantially circular area is provided between adjacent concave edges $2a$ and $3a$ of blades 2 and 3 respectively. Outer blade 3 is connected to simultaneously move blade 2 with it by means of inclined slot and pin means 7, and portion $3b$ of blade 3 provides a cam follower means for opening the blades as is later described in detail.

A blade-driving means 100 includes a rotatably mounted shaft 21 upon which is secured a plate 18. Blade-driving spring 22 of the torsion type reacts between plate 18 and casing 1 in a direction to rotate blade-driving means 100 in a shutter opening direction. A manually-operable latch 23 rotatably mounted upon pin 24 engages plate 18 for holding it in a tensioned condition. Torsion spring 25 maintains latch 23 engaged with plate 18, and manually-operable release button 26 is biased away from latch 23 by torsion spring 27 mounted about pinion 28. A downward pressure upon button 26 accordingly overcomes the force of springs 25 and 27 to release latch 23 from plate 18 thereby permitting the shutter to open and close.

Pneumatic exposure regulating device 102 controls the speed of movement of shutter-driving means 100. Device 102 is for example of the type described in U.S. Patent 2,800,844, and it is connected to shutter-driving means 100 by piston rod 15 which connects crank pins 14 and 16 respectively upon piston 13 and plate 18. Cylinder 12 is connected by suction line 11 with valve plate 10 whose opening is variably covered and uncovered by valve plate 9 connected to movable coil 8 of a galvanometer, which is electrically connected to photoelectric element 17. Valve plate 9 is accordingly adjusted in response to the ambient illumination detected by photoelectric element 17 to regulate the retarding effect applied to piston 13 of the automatic shutter regulating device 12. The greater the opening in plate 10 uncovered by valve element 9 the less the retarding effect upon piston 13, which in turn governs the speed of movement of blade-driving means 100. Blade-driving means 100 includes a cam means 19 for imparting a blade-opening impulse to blades 2 and 3 by contact of its nose $19b$ with follower portion $3b$ of blade 3.

The mass of cam element 19 is concentrated in the form of its enlarged end $19c$ remote from the axis of rotation of shaft 21. Concentrated mass $19c$ is urged toward the axis of rotation of driving means 100 by compression spring 20 reacting between shaft 21 and cam element 19. However, when blade-driving means 100 is rotated at relatively high shutter-opening speeds, the heavier end $19c$ of cam 19 generates sufficient centrifugal force exerted outwardly along the line of arrow $19d$ to compress spring 20 a substantial amount thereby retracting actuating nose $19b$ of cam 19 away from follower blade section $3d$. However, when the speed of rotation of cam means 19 is relatively slow, spring 20 can maintain nose $19b$ of element 19 extended a relatively greater distance in engagement with follower section 3d of blade 3. The speed and duration of the impulse delivered by cam 19 to follower 3b are accordingly functions of the speed of rotation of cam 19 and are respectively increased and decreased with increasing speed of rotation of cam means 19. The amount of aperture opening provided by blades 2 and 3 is also a function of the speed of rotation of cam means 19, and larger openings between blades 2 and 3 are only provided at slower speeds of cam 19 and blades 2 and 3.

A motion-limiting assembly 104 is also provided for cooperating with blades 2 and 3 for more precisely controlling that amount of opening movement and effective aperture opening of the shutter in the absence of a usual auxiliary diaphragm. Motion-limiting means 104 includes an anvil 35 mounted upon a carrier 29 which is movably mounted upon casing 1, for example, concentrically about the aperture opening 105 in casing 1. An actuating spring 33 reacts between casing 1 and arm 106 of assembly 104 to urge it toward positions defining larger aperture openings, and the speed of movement of assembly 104 is retarded by damping piston 31 arranged within cylinder 30. Piston 31 is connected to arm 106 by connecting rod 32. A scanning finger 34 extends from carrier 29 into contact with arresting surface 108 upon plate 18 of blade driving means 100. Motion-limiting assembly 104 is accordingly maintained in its minimal aperture providing condition before blade-driving means 100 is released, and it does not start to move toward larger aperture establishing positions until blade-driving means 100 is released and finger 34 is moved towards final arresting surface 110 of blade 18. Motion of assembly 104 is retarded by piston 31 in cylinder 30. When blade driving means 100 moves very quickly to deliver a fast impulse of short duration to blades 2 and 3, anvil 35 can only move a short distance away from blade 3; and only a very small aperture opening can be provided between concave blade surfaces 3a and 2a before the blades rebound from contact with anvil 35. Small aperture openings are accordingly coordinated with relatively fast shutter blade speeds. When shutter-driving means 100 operates more slowly to deliver shutter opening impulses of longer duration to blades 3 and 2, anvil 35 has time to move a greater distance away from the outside of blade 3 to provide relatively larger aperture openings up to full aperture opening at relatively slower shuttter speeds.

A shutter of this type can be made even more positive in action by providing separate motion-limiting means for each of the shutter blades and providing a path of motion for both of these motion-limiting means that rebound each of the blades simultaneously and symmetrically by contact with separate anvils.

What is claimed is:

1. A photographic lens shutter mechanism comprising a shutter casing having an aperture, a set of shutter blades, movable means mounting said shutter blades upon said casing for causing them to define between adjacent edges an aperture opening of variable size, resilient biasing means reacting against said blades in a direction to close them, blade-driving means mounted upon said casing in operative engagement with said set of shutter blades for imparting an opening impulse to said blades, said blade-driving means delivering faster impulses of shorter duration and slower impulses of longer duration, control means connected to said shutter-driving means for varying the speed of delivery of said impulses, motion-limiting means mounted in the path of opening movement of said set of blades for determining a limit thereof whereby the aperture opening defined by said blades is made substantially precise, movable means mounting said motion-limiting means upon said casing for permitting said aperture opening provided thereby to be varied, resilient means biasing said motion-limiting means to move toward positions defining larger aperture openings, and a coordinating means connecting said motion-limiting means with said shutter-driving means for causing said motion-limiting means to commence movement in a direction providing larger aperture openings when said shutter-driving means commence its movement whereby said motion-limiting means is caused to define larger aperture openings for said set of shutter blades the slower and longer the duration of their opening movement.

2. A mechanism as set forth in claim 1 wherein the adjacent edges of said set of shutter blades are shaped concavely and overlap in the closed condition for causing them to define substantially circular aperture openings of increasing size as they are moved apart from each other.

3. A mechanism as set forth in claim 1 wherein said blade driving means comprises a cam means, said cam means being mounted upon a rotatable plate, resilient driving means reacting between said casing and said plate for rotating it, manually-operable latching means mounted upon said casing in engagement upon said plate for releasing its movement, follower means connected to said set of blades and being interposed into the path of movement of said cam means for delivering said opening impulse to said set of shutter blades, resilient connecting means reacting between said cam means and said plate in a direction to increase the extent of engagement of said cam means with said follower means, and said mass of said cam means being arranged remote from its center of rotation and being sufficient to overcome said resilient connecting means and move said cam means to decrease said extent of engagement with said follower means the faster the speed of rotation of said plate and cam means.

4. A mechanism as set forth in claim 3 wherein said set of movable blades includes pivoted blades, a portion of one of said pivoted blades extending remote from its aperture-forming portion to provide said follower means, and coupling means connecting said blades of said set for causing them to simultaneously move apart in response to movement of said follower means.

5. A mechanism as set forth in claim 4 wherein said coupling means comprises inclined pin and slot means.

6. A mechanism as set forth in claim 1 wherein said motion-limiting means comprises a motion-limiting assembly, an anvil for providing a contact surface for said set of blades in their path of movement mounted upon said assembly, movable means mounting said assembly upon said casing for causing the orientation of said anvil to vary with respect to said path of movement of said blades, motion-damping means connected to said assembly for retarding its movement, an arresting surface provided upon said shutter-driving means, a finger extending from said motion-limiting assembly into contact with said motion-arresting surface, and said motion-arresting surface being shaped to release said finger and said assembly when said blade-driving means commences its movement and to subsequently restrain it when said shutter-driving means terminates its movement whereby said assembly can move said anvil to provide larger aperture opening the slower the movement of said blade-driving means and said blades.

7. A mechanism as set forth in claim 6 wherein motion-damping means comprises a dash pot.

8. A mechanism as set forth in claim 1 wherein said coordinating means comprises an automatic exposure-regulating device having an element whose speed of movement is retarded in accordance with the ambient illumination, and a link connecting said automatic regulating device to said blade-driving means for causing said blade-driving means to move slower the longer an exposure is required by said ambient illumination.

9. A mechanism as set forth in claim 8 wherein said automatic exposure regulating device comprises a pneumatic automatic exposure regulating device incorporating a piston whose speed of movement is governed by ambient light conditions, and said link connecting said piston to said blade-driving means.

10. A photographic lens shutter mechanism comprising a shutter casing having an aperture, a set of shutter blades, movable means mounting said shutter blades upon said casing for causing them to define between adjacent edges an aperture opening of variable size, resilient means reacting against said blades in a direction to close them, blade-driving means mounted upon said casing in operative engagement with said set of shutter blades for imparting an opening impulse to said blades, said shutter driving means delivering faster impulses of shorter duration and slower impulses of longer duration, control means connected to said shutter-driving means for varying the speed of delivery of said impulses, said shutter-driving means including a cam means, said cam means being mounted upon a rotatable plate, resilient means reacting between said casing and said plate for rotating it, movable latching means mounted upon said casing in engagement upon said plate for releasing its movement, follower means connected to said set of blades and being interposed into the path of movement of said cam means for delivering said opening impulse to said set of shutter blades, resilient means reacting between said cam means and said plate in a direction to increase the extent of engagement of said cam means with said follower means, said mass of said cam means being concentrated remote from its axis of rotation and being sufficient to overcome said resilient means and decrease said extent of engagement with said follower means the faster the speed of rotation of said plate and said cam means, said set of movable blades including pivoted blades, a portion of one of said pivoted blades extending remote from its aperture forming portion to provide said follower means, coupling means connecting said blades of said set for causing them to simultaneously move apart in response to movement of said follower means, said coupling means comprising inclined pin and slot means, motion-limiting means being mounted in the path of opening movement of said set of blades for determining a limit thereof whereby the aperture opening defined by said blades is made substantially precise, movable means mounting said motion-limiting means upon said casing for permitting said aperture opening provided thereby to be varied, resilient means biasing said motion-limiting means to move toward positions defining larger aperture openings, and a coordinating means connecting said motion-limiting means with said shutter-driving means for causing said motion-limiting means to commence movement in a direction providing larger aperture openings when said shutter-driving means commences its movement whereby said motion-limiting means is caused to define larger aperture openings for said set of shutter blades the slower and longer the duration of their opening movement.

References Cited by the Examiner
UNITED STATES PATENTS

| 436,404 | 9/1890 | Dallmayer | 95—63 |
| 2,999,445 | 9/1961 | Fahlenberg | 95—63 |
| 3,029,719 | 4/1962 | Distel | 95—10 |
| 3,051,065 | 8/1962 | Kobayashi | 95—64 X |

JOHN M. HORAN, *Primary Examiner.*

NORTON ANSHER, *Examiner.*